US012705478B2

(12) United States Patent
Spoliansky

(10) Patent No.: US 12,705,478 B2
(45) Date of Patent: Aug. 11, 2026

(54) IMPLICIT CURRICULUM LEARNING

(71) Applicant: PayPal, Inc., San Jose, CA (US)

(72) Inventor: Roi Spoliansky, Ramat Yishay (IL)

(73) Assignee: PayPal, Inc., San Jose, CA (US)

( * ) Notice: Subject to any disclaimer, the term of this patent is extended or adjusted under 35 U.S.C. 154(b) by 1090 days.

(21) Appl. No.: 17/356,808

(22) Filed: Jun. 24, 2021

(65) Prior Publication Data

US 2022/0414447 A1 Dec. 29, 2022

(51) Int. Cl.

*G06N 3/08* (2023.01)
*G06F 18/21* (2023.01)
*G06F 18/214* (2023.01)

(52) U.S. Cl.

CPC ............. *G06N 3/08* (2013.01); *G06F 18/214* (2023.01); *G06F 18/217* (2023.01)

(58) Field of Classification Search

CPC ....... G06N 3/08; G06F 18/217; G06F 18/214; G06F 18/21

See application file for complete search history.

(56) References Cited

U.S. PATENT DOCUMENTS 11,783,175 B2 * 10/2023 Leskovec ................ G06N 3/08 706/12
2014/0304774 A1 * 10/2014 Bejerasco ............... G06F 21/62 726/3
2016/0350655 A1 12/2016 Weiss et al.
2018/0121799 A1 5/2018 Hashimoto et al.
2019/0354857 A1 11/2019 Sallee et al.
2020/0160177 A1 5/2020 Durand et al.
2020/0320371 A1 10/2020 Baker
2021/0142181 A1 5/2021 Liu et al.
2022/0012741 A1 * 1/2022 Raj ...................... G06Q 20/405

OTHER PUBLICATIONS

Shuai Zheng, “Accelerating Deep Learning with Shrinkage and Recall”, 2016, IEEE 22nd International Conference on Parallel and Distributed Systems (Year: 2016).*

(Continued)

*Primary Examiner* — Michael J Huntley
*Assistant Examiner* — Christopher Dillon Devore
(74) *Attorney, Agent, or Firm* — Greenberg Traurig, LLP

(57) ABSTRACT

Systems and techniques for facilitating implicit curriculum learning are provided. These allow for improved machine learning systems that can automatically execute curriculum learning without drawbacks such as pre-sorting data into different epochs which may have varying degrees of difficulty (e.g. easiest first, then harder epochs). Applicant’s techniques can be executed more efficiently by automatically iterating over a data set, which need not be manually separated into different epochs. Thus, a system can access a neural network and a set of labeled data candidates. In various aspects, the system can perform a plurality of training epochs on the neural network based on the set of labeled data candidates. In various instances, the system can iteratively update the set of labeled data candidates as the plurality of training epochs are performed, by removing, after each training epoch, a dropout percentage of those labeled data candidates which the neural network correctly classified during the training epoch.

20 Claims, 8 Drawing Sheets

(56) References Cited

OTHER PUBLICATIONS

Lu Jiang, "Self-Paced Curriculum Learning", 2015, Twenty-Ninth AAAI Conference on Artificial Intelligence (Year: 2015).*
Wei Zheng, "Unsupervised feature selection by self-paced learning regularization", 2020, Pattern Recognition Letters 132 (Year: 2020).*
Kumar et al, "Self Paced Learning for Latent Variable Models", 2010 (Year: 2010).*
Durand et al, "System and Method for a Convolutional Neural Network for Multi-Label Classification With Partial Annotations", 2019 (Year: 2019).*
Avramova, "Curriculum Learning with Deep Convolutional Neural Networks", 2015 (Year: 2015).*
International Search Report and Written Opinion for Application No. PCT/US2022/033432, mailed on Oct. 4, 2022, 15 pages.

* cited by examiner

500

502

| Implicit Curriculum Learning with Constant Dropout Percentage | |
|---|---|
| **Current Epoch** | **Size of Set of Labeled Data Candidates on which Current Epoch is Performed** |
| 1 | $N_1$ |
| 2 | $N_2 = Incorrect_1 + Correct_1 *(1-P_{Drop})$; where $0<P_{Drop} < 1$ and $Incorrect_1 + Correct_1 = N_1$ |
| 3 | $N_3 = Incorrect_2 + Correct_2 *(1-P_{Drop})$; where $0<P_{Drop} < 1$ and $Incorrect_2 + Correct_2 = N_2$ |
| ... | ... |
| $x$ | $N_x = Incorrect_{x-1} + Correct_{x-1} *(1-P_{Drop})$; where $0<P_{Drop} < 1$ and $Incorrect_{x-1} + Correct_{x-1} = N_{x-1}$ |

504

| Implicit Curriculum Learning with Variable Dropout Percentage | |
|---|---|
| **Current Epoch** | **Size of Set of Labeled Data Candidates on which Current Epoch is Performed** |
| 1 | $N_1$ |
| 2 | $N_2 = Incorrect_1 + Correct_1 *(1-P_{Drop\_1})$; where $0<P_{Drop\_1} = f(Incorrect_1, Correct_1) < 1$ and $Incorrect_1 + Correct_1 = N_1$ |
| 3 | $N_3 = Incorrect_2 + Correct_2 *(1-P_{Drop\_2})$; where $0<P_{Drop\_2} = f(Incorrect_2, Correct_2) < 1$ and $Incorrect_2 + Correct_2 = N_2$ |
| ... | ... |
| $x$ | $N_x = Incorrect_{x-1} + Correct_{x-1} *(1-P_{Drop\_x-1})$; where $0<P_{Drop\_x-1} = f(Incorrect_{x-1}, Correct_{x-1}) < 1$ and $Incorrect_{x-1} + Correct_{x-1} = N_{x-1}$ |

FIG. 5

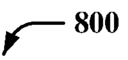
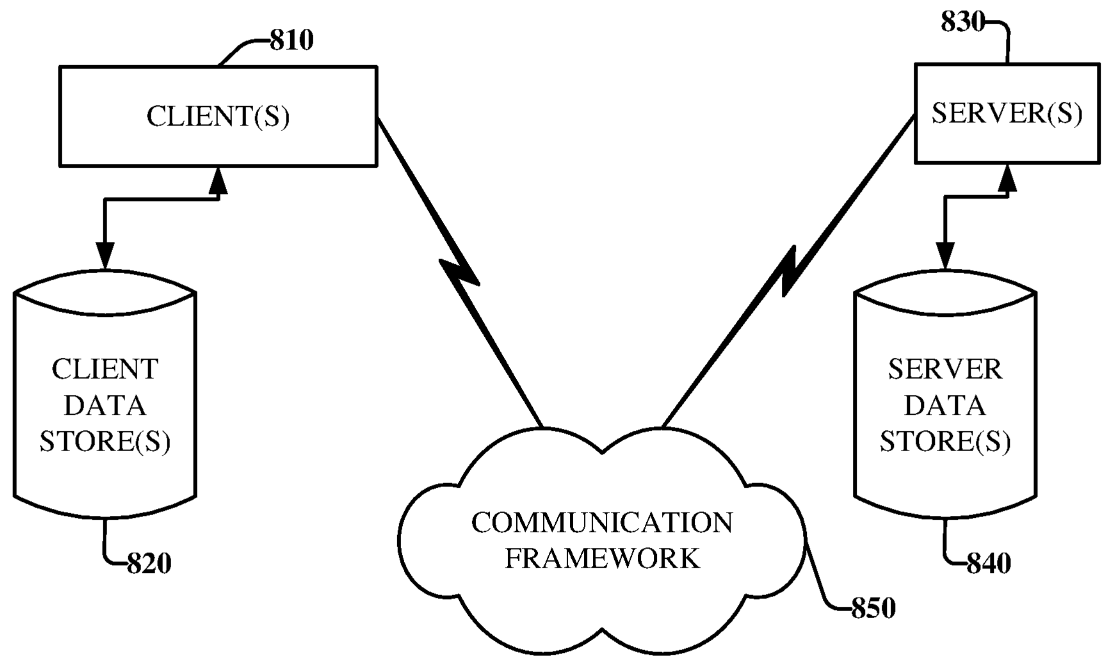
FIG. 8

IMPLICIT CURRICULUM LEARNING

TECHNICAL FIELD

The subject disclosure relates generally to neural networks, and more specifically to implicit curriculum learning for neural networks.

BACKGROUND

Curriculum learning is a technique for training a neural network. However, Applicant recognizes that techniques for facilitating curriculum learning exhibit at least two significant disadvantages. First, certain techniques for facilitating curriculum learning frequently involve manual structuring/ordering of a series of training epochs by operators/engineers. Such manual structuring/ordering of the series of training epochs can be highly time-intensive. Second, certain techniques for facilitating curriculum learning may require that operators/engineers have an explicit definition/metric that distinguishes easy-to-classify data candidates from difficult-to-classify data candidates.

Accordingly, Applicant describes herein systems and techniques that provide improved methods for curriculum learning in machine learning contexts.

BRIEF DESCRIPTION OF THE DRAWINGS

FIG. 5 illustrates example, non-limiting tables showing how implicit curriculum learning can cause a training dataset to become progressively smaller and more difficult to classify in accordance with one or more embodiments described herein.

FIG. 8 illustrates an example networking environment operable to execute various implementations described herein.

DETAILED DESCRIPTION

Figure 1:
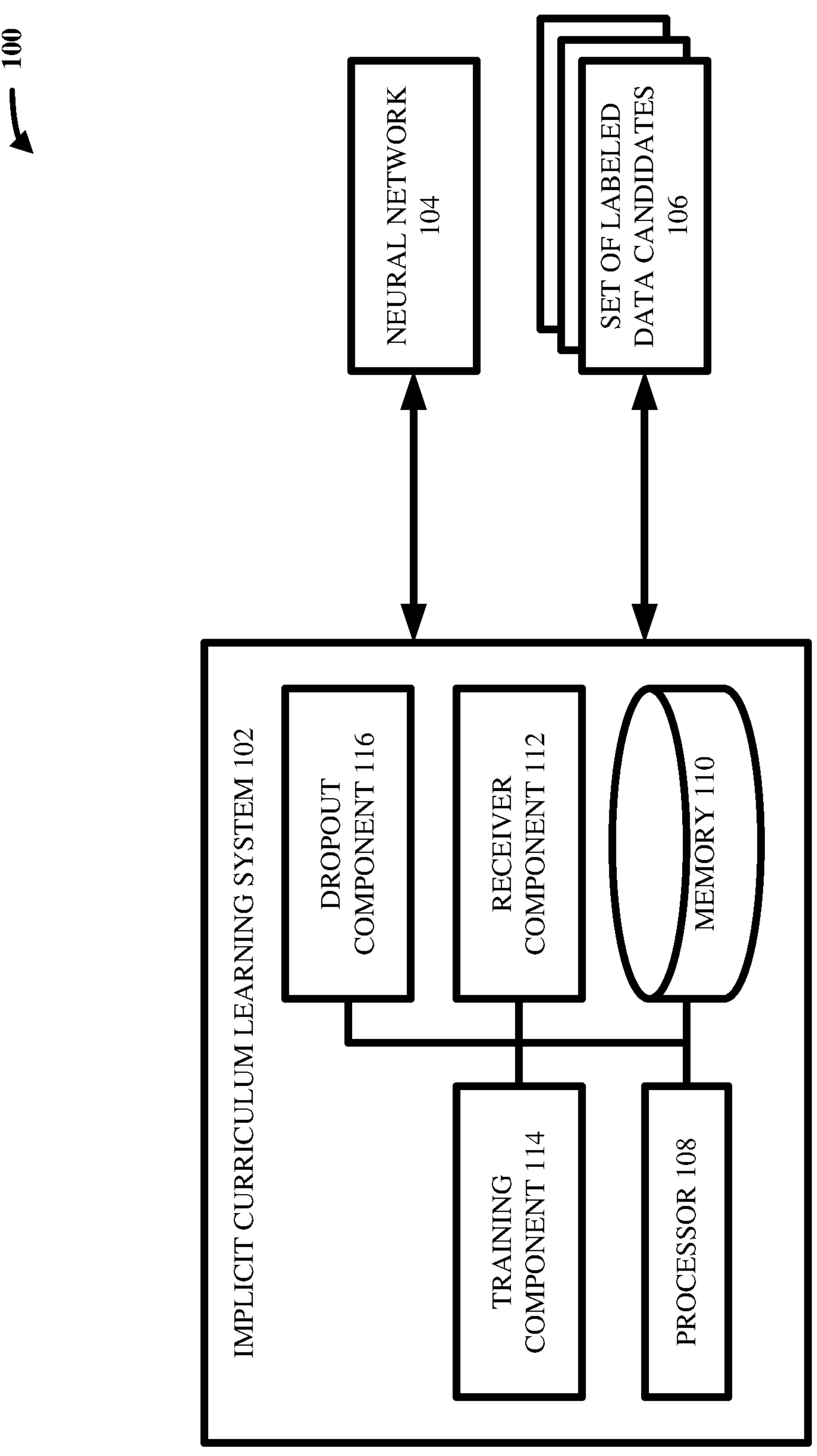
FIG. 1 illustrates a high-level block diagram of an example, non-limiting system that facilitates implicit curriculum learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Curriculum learning is a technique for training a neural network. Consider a neural network that is configured to classify data candidates. That is, the neural network can be configured to receive as input a data candidate (e.g., where a data candidate can be one or more images, one or more sound recordings, and/or any other suitable type of input data) and to produce as output a label that identifies one or more classes to which the data candidate belongs. During training of the neural network, the neural network can undergo a series of training epochs. During each training epoch, the neural network can be executed on each of a batch of labeled data candidates, thereby yielding a batch of outputted classifications, and the batch of outputted classifications can be leveraged to update (e.g., via backpropagation) the internal parameters (e.g., weights, biases) of the neural network. Thus, after all the training epochs are completed, the internal parameters of the neural network can have been iteratively optimized to accurately classify data candidates.

When curriculum learning is implemented, the series of training epochs can be structured, ordered, and/or otherwise organized such that the training epochs get progressively more difficult over time. That is, training epochs that occur earlier in the series of training epochs can contain labeled data candidates which are considered to be easier for the neural network to accurately classify, while training epochs that occur later in the series of training epochs can contain labeled data candidates which are considered to be harder and/or more complicated for the neural network to accurately classify. When easier training epochs are performed before more difficult training epochs, the neural network can more steadily and incrementally improve in classification accuracy. Indeed, when curriculum learning is implemented, the neural network can be considered as learning in a fashion that is similar to how human beings learn (e.g., by first learning basic concepts, such as humans do in elementary school, and subsequently learning complicated concepts, such as humans do in high school or college).

However, certain techniques for facilitating curriculum learning exhibit two significant disadvantages. First, certain techniques for facilitating curriculum learning involve manual structuring, ordering, and/or organizing of the series of training epochs by operators and/or engineers. In other words, operators and/or engineers that are overseeing the neural network manually generate and/or curate the series of training epochs (e.g., they manually craft the batch of labeled data candidates in each training epoch, to ensure that the batch of labeled data candidates is of an appropriate difficulty level). Such manual structuring, ordering, and/or organizing of the series of training epochs can be highly time-intensive and thus suboptimal. Second, certain techniques for facilitating curriculum learning require that there be an explicit definition and/or metric that distinguishes easy-to-classify data candidates from difficult-to-classify data candidates. In other words, when certain techniques are implemented, there is a need for an explicit criterion that allows the operators and/or engineers to objectively tell lower-difficulty data candidates apart from higher-difficulty data candidates. Indeed, without such an explicit definition and/or metric, certain techniques cannot facilitate curriculum learning. That is, without an objective criterion by which to tell easy data candidates apart from difficult data candidates, the series of training epochs cannot be structured and/or organized in order of increasing difficulty, when certain techniques are utilized. Unfortunately, it is often the case that such an explicit definition/metric is not known at time of training.

Accordingly, systems and/or techniques that can address one or more of these technical problems can be advantageous.

Various embodiments described herein can address one or more of these technical problems. One or more embodiments described herein include systems, computer-implemented methods, apparatus, and/or computer program products that can facilitate implicit curriculum learning. In other words, various embodiments described herein can include a computerized tool (e.g., any suitable combination of computer-executable hardware and/or computer-executable software) that can electronically train a neural network in a curriculum learning fashion, without manual intervention and/or without requiring an explicit definition/metric that distinguishes easy data candidates from difficult data candidates.

As explained above, certain techniques for facilitating curriculum learning generally rely on extensive manual intervention by operators/engineers. Moreover, as also explained above, certain techniques for facilitating curriculum learning require that there be some objective and explicit criterion by which to distinguish low-difficulty data candidates from high-difficulty data candidates. Unfortunately, it is often the case that such an objective and explicit criterion is not available/known, meaning that curriculum learning often cannot be facilitated in practice when certain techniques are used (e.g., without such an objective and explicit criterion, operators/engineers cannot organize a series of training epochs in order of increasing difficulty).

The inventors of various embodiments described herein devised a solution to ameliorate this technical problem. Specifically, the inventors recognized that, in the absence of an objective and explicit criterion that distinguishes easy-to-classify data candidates from difficult-to-classify data candidates, the neural network's own classification accuracy with respect to labeled data candidates can serve as an implicit proxy for such an objective and explicit criterion. In other words, when there is no explicit definition/metric that allows operators/engineers to tell easy data candidates apart from difficult data candidates, the neural network itself can tell the operators/engineers which data candidates it finds easy and which data candidates it finds difficult. More specifically, labeled data candidates which the neural network correctly classifies during a given training epoch can be considered as being easy-to-classify for the neural network, while labeled data candidates which the neural network incorrectly classifies during the given training epoch can be considered as being difficult-to-classify for the neural network. Accordingly, a portion and/or percentage of those labeled data candidates which the neural network correctly classified during the given training epoch can be dropped out and/or otherwise removed, such that they are not present in the next training epoch. On the other hand, all of those labeled data candidates which the neural network incorrectly classified during the given training epoch can be retained, so that they are present in the next training epoch. Accordingly, the next training epoch can contain more difficult-to-classify labeled data candidates and fewer easy-to-classify labeled data candidates, as compared to the given training epoch. In other words, the next training epoch can be considered as being harder and/or more difficult for the neural network than the given training epoch, which is in accordance with curriculum learning. Thus, in this fashion, curriculum learning can be facilitated even in the absence of an explicit definition/metric that allows operators/engineers to manually distinguish easy-to-classify data candidates from difficult-to-classify data candidates. Because various embodiments described herein can facilitate curriculum learning without requiring such an explicit definition/metric, various embodiments described herein can be referred to as facilitating implicit, as opposed to explicit, curriculum learning.

In various embodiments, a computerized tool as described herein can comprise a receiver component, a training component, and/or a dropout component.

Consider a neural network. In various aspects, the neural network can exhibit any suitable deep learning architecture (e.g., can comprise any suitable number of layers, can comprise any suitable numbers of neurons in various layers, can comprise any suitable activation functions in various neurons, can comprise any suitable interneuron connectivity patterns). In various instances, the neural network can be configured to receive as input a data candidate and to produce as output a classification of the data candidate. In various cases, the data candidate can be any suitable type of input data (e.g., can be one or more scalars, one or more vectors, one or more matrices, one or more tensors, one or more character strings, and/or any suitable combination thereof). In various aspects, the classification can be any suitable label that identifies one or more classes to which the data candidate belongs (e.g., that identifies one or more classes to which the neural network believes that the data candidate belongs). In various instances, it can be desired to train the neural network in a curriculum learning fashion on a set of labeled data candidates, where each data candidate in the set of labeled data candidates has a corresponding ground-truth classification that can be used to support backpropagation. However, it can be the case that there exists no objective, explicit definition/metric that would allow easy-to-classify data candidates in the set of labeled data candidates to be distinguished from difficult-to-classify data candidates in the set of labeled data candidates. As explained herein, the computerized tool can facilitate curriculum learning of the neural network on the set of labeled data candidates, even in the absence of such an objective, explicit definition/metric.

In various embodiments, the receiver component of the computerized tool can electronically receive and/or otherwise electronically access the neural network and/or the set of labeled data candidates. In various cases, the receiver component can electronically retrieve the neural network and/or the set of labeled data candidates from any suitable database and/or data structure (e.g., graph data structure, relational data structure, hybrid data structure) that is electronically accessible to the receiver component, whether the database and/or data structure is centralized and/or decentralized, and/or whether the database and/or data structure is local to and/or remote from the receiver component. In any case, the receiver component can electronically access the neural network and/or the set of labeled data candidates, such that other components of the computerized tool can interact with (e.g., read, write, copy, edit) the neural network and/or the set of labeled data candidates.

In various embodiments, the training component of the computerized tool can electronically perform a first training epoch on the neural network, based on the set of labeled data candidates. More specifically, for each given labeled data candidate in the set of labeled data candidates, the training component can electronically feed the given labeled data candidate to the neural network, which can cause the neural network to electronically produce as output a given classification for the given labeled data candidate. In various instances, the training component can compute an error/loss between the given classification and a given ground-truth classification that corresponds to the given labeled data candidate. In various cases, the training component can repeat this procedure for each of the set of labeled data candidates, thereby yielding a set of errors/losses. In various aspects, the training component can use the set of errors/losses to update parameters (e.g., weights, biases) of the neural network. For instance, the training component can compute an average error/loss based on the set of errors/losses, and the training component can backpropagate the average error/loss so as to iteratively update the parameters of the neural network. At this point, the first training epoch can, in various cases, be considered as complete and/or finished.

In various embodiments, the dropout component of the computerized tool can electronically modify and/or update the set of labeled data candidates after the first training epoch has been completed/finished and before a second training epoch is commenced. More specifically, the dropout component can electronically identify a correctly-classified subset and an incorrectly-classified subset. In various instances, the correctly-classified subset can include all labeled data candidates which are in the set of labeled data candidates and which were correctly and/or accurately classified by the neural network during the first training epoch. In various cases, the incorrectly-classified subset can include all labeled data candidates which are in the set of labeled data candidates and which were not correctly and/or accurately classified by the neural network during the first training epoch. Because the correctly-classified subset can include all labeled data candidates which the neural network accurately classified during the first training epoch, the correctly-classified subset can be considered as a set of easy-to-classify data candidates. On the other hand, because the incorrectly-classified subset can include all labeled data candidates which the neural network failed to accurately classify during the first training epoch, the incorrectly-classified subset can be considered as a set of difficult-to-classify data candidates.

In various aspects, the dropout component can check whether a training termination criterion has yet been satisfied by the neural network. In some cases, the training termination criterion can be whether the number of training epochs performed so far on the neural network by the training component is above any suitable threshold (e.g., that is, it can be desired to train the neural network until a particular number of training epochs have been performed). In other cases, the training termination criterion can be whether the value of the most recent average error/loss computed by the training component is below any suitable threshold (e.g., that is, it can be desired to train the neural network until the average error/loss of the neural network is minimized). In still other cases, the training termination criterion can be based on a size of the correctly-classified subset and/or a size of the incorrectly-classified subset. As an example, the training termination criterion can be whether the size of the correctly-classified subset is greater than any suitable threshold (e.g., that is, it can be desired to train the neural network until the neural network accurately classifies more than a threshold number of data candidates during a training epoch). As another example, the training termination criterion can be whether the size of the incorrectly-classified subset is lesser than any suitable threshold (e.g., that is, it can be desired to train the neural network until the neural network inaccurately classifies fewer than a threshold number of data candidates during a training epoch). As yet another example, the training termination criterion can be whether a ratio of the size of the correctly-classified subset to the size of incorrectly-classified subset is greater than any suitable threshold (e.g., that is, it can be desired to train the neural network until the neural network accurately classifies at least a threshold proportion of a batch of data candidates during a training epoch). As still another example, the training termination criterion can be whether a ratio of the size of the incorrectly-classified subset to the size of correctly-classified subset is lesser than any suitable threshold (e.g., that is, it can be desired to train the neural network until the neural network inaccurately classifies no more than a threshold proportion of a batch of data candidates during a training epoch). In various aspects, the training termination criterion can be any other suitable termination criterion.

In various instances, if the dropout component determines that the training termination criterion is not yet satisfied, the dropout component can electronically access and/or otherwise electronically compute a dropout percentage with which to reduce the size of the set of labeled data candidates. In various aspects, the dropout percentage can be a real-valued scalar having any suitable magnitude that is greater than 0 and less than 1. In some cases, the dropout percentage can be a constant that is independent of the size of the correctly-classified subset and/or of the size of the incorrectly-classified subset. For example, the dropout percentage can be equal to 0.3 (e.g., 30%), no matter the size of the correctly-classified subset and/or the size of the incorrectly-classified subset. In other cases, the dropout percentage can be equal to any suitable mathematical function that takes as arguments the size of the correctly-classified subset and/or the size of the incorrectly-classified subset. For example, the dropout percentage can be equal to and/or otherwise based on the result obtained by applying a sigmoid-type function to the ratio between the size of the correctly-classified subset and the size of the incorrectly-classified subset. In such case, the value of the dropout percentage could increase asymptotically to 1 as the ratio between the size of the correctly-classified subset and the size of the incorrectly-classified subset gets larger, and could decrease asymptotically to 0 as the ratio between the size of the correctly-classified subset and the size of the incorrectly-classified subset gets smaller. Stated differently, the value of the dropout percentage could vary inversely with the reciprocal of such ratio. In various other cases, the dropout percentage can be equal to any suitable mathematical function that takes as an argument a total number of training epochs to be performed on the neural network. For example, the dropout percentage could vary inversely with the maximum number of training epochs to be performed (e.g., as the maximum number of training epochs to be performed gets larger, the dropout percentage can asymptotically approach 0; as the maximum number of training epochs to be performed gets smaller, the dropout percentage can asymptotically approach 1). In various aspects, the dropout component can access and/or otherwise compute the dropout percentage in any other suitable fashion.

In various instances, once the dropout component accesses and/or otherwise computes the dropout percentage, the dropout component can electronically modify and/or update the set of labeled data candidates based on the dropout percentage, thereby yielding an updated set of labeled data candidates. More specifically, the dropout component can shrink the size of the correctly-classified subset by the dropout percentage. That is, the dropout component can remove, eliminate, and/or otherwise delete a portion of the correctly-classified subset, which portion is equal to and/or within any suitable margin of the dropout percentage. In other words, the dropout component can remove, eliminate, and/or delete from the correctly-classified subset enough labeled data candidates, such that the ratio of the size of the correctly-classified subset after such removal/elimination/deletion to the size of the correctly-classified subset before such removal/elimination/deletion is equal to and/or within any suitable margin of unity minus the dropout percentage. In still other words, the dropout component can, in various instances, multiply the unchanged size of the correctly-classified subset by the dropout percentage, and the resulting number (e.g., rounded up and/or down to the nearest positive integer as appropriate) can be the number of labeled data candidates that the dropout component deletes from the correctly-classified subset.

In any case, the dropout component can reduce the size of the correctly-classified subset by the dropout percentage. In various aspects, however, the dropout component can refrain from reducing the size of the incorrectly-classified subset (e.g., can refrain from removing, eliminating, and/or deleting any labeled data candidates from the incorrectly-classified subset). Accordingly, the total result can be an updated set of labeled data candidates that contains all of the incorrectly-classified subset and that contains a shrunken and/or reduced version of the correctly-classified subset. As mentioned above, the correctly-classified subset can be considered as containing the labeled data candidates which the neural network found easy to classify, while the incorrectly-classified subset can be considered as containing the labeled data candidates which the neural network found difficult to classify. Thus, by reducing the size of the correctly-classified subset by the dropout percentage and by maintaining the size of the incorrectly-classified subset, the updated set of labeled data candidates can contain a greater proportion of difficult-to-classify data candidates and a smaller proportion of easy-to-classify data candidates, as compared with the un-updated set of labeled data candidates. That is, the updated set of labeled data candidates can be considered as being harder and/or more difficult for the neural network to classify, which is in accordance with curriculum learning.

In various embodiments, the training component of the computerized tool can then perform a second training epoch on the neural network, based on the updated set of labeled data candidates. Just as described above, once the training component completes/finishes the second training epoch, the dropout component can: identify a new correctly-classified subset and a new incorrectly-classified subset based on the neural network's classification accuracy during the second training epoch; check the training termination criterion; access and/or compute the dropout percentage; and/or reduce the size of the new correctly-classified subset, thereby resulting in a twice-updated set of labeled data candidates that is even harder and/or more difficult for the neural network to classify than the once-updated set of labeled data candidates. In various cases, the training component and dropout component can repeat the above-described functionalities for any suitable number of training epochs, with the result being that the set of labeled data candidates becomes progressively smaller and more difficult to classify after each training epoch.

To help clarify some of the above discussion, consider the following non-limiting example. Any numbers used in this example are non-limiting and are for purposes of illustration. Suppose that it is desired to train a neural network in a curriculum learning fashion on a set of 10,000 labeled data candidates. In various aspects, the training component of the computerized tool can perform a first training epoch on the neural network by executing the neural network on each of the 10,000 labeled data candidates and updating the internal parameters of the neural network accordingly. Suppose that, during the first training epoch, the neural network accurately classifies 1,000 of the labeled data candidates and inaccurately classifies the remaining 9,000 labeled data candidates. Accordingly, the dropout component of the computerized tool can identify as the correctly-classified subset the 1,000 labeled data candidates that were accurately classified. Similarly, the dropout component can identify as the incorrectly-classified subset the 9,000 labeled data candidates that were inaccurately classified.

At this point, the dropout component can access and/or otherwise compute the dropout percentage. For sake of simplicity, suppose that the dropout percentage is a constant of 0.3, which is 30%. In such case, the dropout component can remove, eliminate, and/or delete 30% of the correctly-classified subset. Since the correctly-classified subset in this example includes 1,000 labeled data candidates, the dropout component can remove, eliminate, and/or delete 300 of those 1,000 labeled data candidates (e.g., 300=0.3*1,000). In various aspects, the 300 removed, eliminated, and/or deleted labeled data candidates can be chosen randomly and/or in any other suitable fashion from the correctly-classified subset. Now, there are no longer 10,000 labeled data candidates to facilitate training of the neural network. Instead, there are 9,700 labeled data candidates to facilitate training of the neural network: the 9,000 labeled data candidates that were inaccurately classified during the first training epoch, and the remaining 700 labeled data candidates that were accurately classified during the first training epoch and that were not removed, eliminated, and/or deleted by the dropout component. Such 9,700 labeled data candidates can be considered as an updated set of labeled data candidates produced by the dropout component.

In various cases, the training component can perform a second training epoch by executing the neural network on each of the remaining 9,700 labeled data candidates and updating the neural network's parameters accordingly. Suppose that, during the second training epoch, the neural network accurately classifies 2,500 labeled data candidates and inaccurately classifies the remaining 7,200 labeled data candidates. In such case, the dropout component of the computerized tool can identify as the correctly-classified subset the 2,500 labeled data candidates that were accurately classified. Similarly, the dropout component can identify as the incorrectly-classified subset the 7,200 labeled data candidates that were inaccurately classified.

Since the dropout percentage in this non-limiting example is a constant of 0.3, the dropout component can again remove, eliminate, and/or delete 30% of the correctly-classified subset. Since the correctly-classified subset for the second training epoch includes 2,500 labeled data candidates, the dropout component can remove, eliminate, and/or delete 750 of those 2,500 labeled data candidates (e.g., 750=0.3*2,500). In various aspects, the 750 removed, eliminated, and/or deleted labeled data candidates can be chosen randomly and/or in any other suitable fashion from the correctly-classified subset. Now, there are no longer 9,700 labeled data candidates to facilitate training of the neural network. Instead, there are 8,950 labeled data candidates to facilitate training of the neural network: the 7,200 labeled data candidates that were inaccurately classified during the second training epoch, and the remaining 1,750 labeled data candidates that were accurately classified during the second training epoch and that were not removed, eliminated, and/or deleted by the dropout component. In various cases, the remaining 8,950 labeled data candidates can be considered as a twice-updated set of labeled data candidates and can used to facilitate a third training epoch of the neural network.

In various aspects, the training component and the dropout component can repeat this procedure for any suitable number of training epochs (e.g., until a training termination criterion is met). As can be seen, after each training epoch performed by the training component, the dropout component can reduce the size of the set of labeled data candidates by removing a dropout percentage of labeled data candidates that the neural network correctly and/or accurately classified in the most recent training epoch. This can cause the set of labeled data candidates to become progressively smaller and progressively more difficult to classify as more training epochs are performed (e.g., in the above non-limiting example, the set of labeled data candidates began with a size of 10,000, then was reduced to 9,700 by removing some data candidates that were correctly classified during the first training epoch, and then was reduced again to 8,950 by removing additional data candidates that were correctly classified during the second training epoch), which is in accordance with curriculum learning. Moreover, note that such curriculum learning can be automatically facilitated by the computerized tool described herein without relying upon and/or otherwise requiring that the training epochs be manually structured and/or organized in order of increasing difficulty. Indeed, implementation of the dropout percentage as described herein can automatically ensure that the training epochs become progressively harder. Furthermore, note that such curriculum learning can be facilitated without relying upon and/or otherwise requiring an objective, explicit definition/metric to distinguish difficult data candidates from easy data candidates. Instead, implicit curriculum learning as described herein allows the neural network itself to determine which data candidates are difficult and which are easy.

Various embodiments described herein can be employed to use hardware and/or software to solve problems that are highly technical in nature (e.g., to facilitate implicit curriculum learning), that are not abstract and that cannot be performed as a set of mental acts by a human. Further, some of the processes performed can be performed by a specialized computer (e.g., a neural network) for carrying out defined tasks related to implicit curriculum learning.

For example, some defined tasks of various embodiments described herein can include: performing, by a computer system comprising a processor, a plurality of training epochs on a neural network based on a set of labeled data candidates; and iteratively updating, by the computer system, the set of labeled data candidates as the plurality of training epochs are performed, wherein the iteratively updating includes: identifying, by the computer system and after each given training epoch in the plurality of training epochs, a correctly-classified subset within the set of labeled data candidates, wherein the correctly-classified subset includes labeled data candidates that the neural network correctly classified during the given training epoch; and removing, by the computer system and from the set of labeled data candidates, a dropout percentage of the correctly-classified subset to generate an updated set of labeled data candidates, wherein the updated set of labeled data candidates is treated as the set of labeled data candidates during a next training epoch that immediately follows the given training epoch.

Such defined tasks are not performed manually by humans. Indeed, neither the human mind nor a human with pen and paper can electronically perform multiple training epochs on a neural network; electronically tabulate, after each training epoch, a correctly-classified subset containing labeled data candidates which the neural network accurately classified during the training epoch; and electronically delete, after each training epoch, a dropout percentage of the correctly-classified subset, thereby causing the set of labeled data candidates to become progressively smaller and more difficult to classify. Instead, various embodiments described herein are inherently and inextricably tied to computer technology and cannot be implemented outside of a computing environment. Specifically, a neural network is a tangible combination of computer-executable hardware and/or computer-executable software that cannot exist outside of a computing environment, and so a computerized tool that can facilitate implicit curriculum learning of a neural network likewise cannot be practicably implemented in any sensible way by human beings without computers.

In various instances, embodiments described herein can integrate into a practical application the disclosed teachings regarding implicit curriculum learning. Indeed, as explained above, certain techniques for facilitating curriculum learning require manual organization of a set of training epochs in order of progressive difficulty, and such manual organization cannot be facilitated without some explicit definition/metric which allows easy-to-classify data candidates to be distinguished from difficult-to-classify data candidates. The inventors of various embodiments described herein devised a solution to this technical problem. Indeed, the inventors recognized that the classification accuracy of a neural network with respect to labeled data candidates can serve as an implicit metric by which to distinguish easy data candidates from difficult data candidates, when an explicit distinguishing metric is not available. Specifically, the computerized tool described herein can electronically perform a plurality of training epochs on a neural network based on a set of labeled data candidates, and the computerized tool can iteratively modify and/or update the set of labeled data candidates after each training epoch. More specifically, after each training epoch, the computerized tool can remove, eliminate, and/or delete from the set of labeled data candidates a dropout percentage (e.g., a portion) of those labeled data candidates which the neural network correctly and/or accurately classified during the most recent training epoch. After such removal, elimination, and/or deletion, the set of labeled data candidates can be smaller. Additionally, after such removal, elimination, and/or deletion, the set of labeled data candidates can include a greater proportion of labeled data candidates which the neural network failed to accurately classify (e.g., can contain more difficult data candidates) and can contain a lesser proportion of labeled data candidates which the neural network accurately classified (e.g., can contain fewer easy data candidates). Thus, the modified and/or updated set of labeled data candidates can be considered as more challenging to classify than prior to the removal, elimination, and/or deletion. Moreover, note that the modified and/or updated set of labeled data candidates can be made more difficult without relying upon any manual intervention and/or any explicit definition of easy-vs-difficult data candidates. Such a computerized tool that can automatically facilitate curriculum learning of a neural network without relying upon the explicit definitions/metrics that are required by certain techniques constitutes a concrete and tangible technical improvement in the field of curriculum learning, and is thus certainly a useful and practical application of computers.

Moreover, in various aspects, embodiments described herein can control real-world and/or tangible devices based on the disclosed teachings. For example, a computerized tool as described herein can electronically train and/or execute a real-world neural network.

It should be appreciated that the figures described herein are non-limiting examples of various embodiments.

FIG. 1 illustrates a high-level block diagram of an example, non-limiting system 100 that can facilitate implicit curriculum learning in accordance with one or more embodiments described herein. As shown, an implicit curriculum learning system 102 can be electronically integrated, via any suitable wired and/or wireless electronic connections, with a neural network 104 and/or with a set of labeled data candidates 106.

In various aspects, the neural network 104 can exhibit any suitable deep learning architecture. For instance, in various cases, the neural network 104 can comprise any suitable number of layers. In various instances, the neural network 104 can comprise any suitable numbers of neurons in various layers (e.g., different layers can have the same and/or different numbers of neurons as each other). In various aspects, the neurons of the neural network 104 can comprise any suitable activation functions (e.g., different neurons can have the same and/or different activation functions as each other), such as sigmoid, softmax, rectified linear unit, and/or hyperbolic tangent. In various cases, the neural network 104 can implement any suitable interneuron connectivity patterns (e.g., forward connections, skip connections, recurrent connections).

In various aspects, the neural network 104 can be configured to receive as input a data candidate and to produce as output a classification based on the data candidate. In various instances, the data candidate can comprise any suitable number of scalars, any suitable number of vectors, any suitable number of matrices, any suitable number of tensors, any suitable number of character strings, and/or any suitable combination thereof. For example, the data candidate can, in some cases, be one or more images. As another example, the data candidate can, in some cases, be one or more sound recordings. As yet another example, the data candidate can, in some cases, be timeseries data. In various aspects, the data candidate can be any other suitable type of input data. In various instances, the classification can be any suitable label that indicates one or more classes to which the data candidate belongs. As a non-limiting example, the neural network 104 can be configured to receive as input data that characterizes, describes, and/or otherwise pertains to an electronic and/or online transaction (e.g., internet sale of goods and/or services), and the neural network 104 can be configured to produce as output a determination that indicates whether the electronic and/or online transaction is likely to be fraudulent.

Although the herein disclosure mainly discusses embodiments where the neural network 104 is configured to classify an inputted data candidate, this is a mere non-limiting example. In various aspects, the neural network 104 can be configured to produce any suitable type and/or format of output data. For example, in some cases, the neural network 104 can be configured to receive as input a data candidate and to produce as output a segmentation and/or mask based on the data candidate. As another example, in some cases, the neural network 104 can be configured to receive as input a data candidate and to produce as output one or more forecasted scalars, vectors, matrices, tensors, character strings, and/or any suitable combination thereof based on the data candidate.

In various instances, the set of labeled data candidates 106 can comprise any suitable number of data candidates, with each data candidate in the set of labeled data candidates 106 corresponding to a ground-truth classification. As those having ordinary skill in the art will appreciate, in embodiments where the neural network 104 is configured to generate output other than a classification, each data candidate in the set of labeled data candidates 106 can correspond to a ground-truth annotation as appropriate. For example, if the neural network 104 is configured to segment inputted data candidates, then each data candidate in the set of labeled data candidates 106 can respectively correspond to a ground-truth segmentation.

In any case, it can be desired to train the neural network 104 in a curriculum learning fashion on the set of labeled data candidates 106. However, it can be the case that there is no explicit definition, metric, and/or other criterion which would allow an operator and/or engineer to manually distinguish easy-to-classify data candidates in the set of labeled data candidates 106 from difficult-to-classify data candidates in the set of labeled data candidates 106. Thus, certain techniques cannot perform curriculum learning on the neural network 104 using the set of labeled data candidates 106. However, the implicit curriculum learning system 102 can address this technical problem, as described herein.

In various embodiments, the implicit curriculum learning system 102 can comprise a processor 108 (e.g., computer processing unit, microprocessor) and a computer-readable memory 110 that is operably coupled to the processor 108. The memory 110 can store computer-executable instructions which, upon execution by the processor 108, can cause the processor 108 and/or other components of the implicit curriculum learning system 102 (e.g., receiver component 112, training component 114, dropout component 116) to perform one or more acts. In various embodiments, the memory 110 can store computer-executable components (e.g., receiver component 112, training component 114, dropout component 116), and the processor 108 can execute the computer-executable components.

In various embodiments, the implicit curriculum learning system 102 can comprise a receiver component 112. In various aspects, the receiver component 112 can electronically receive and/or otherwise electronically access the neural network 104 and/or the set of labeled data candidates 106. In various instances, the receiver component 112 can electronically retrieve and/or obtain the neural network 104 and/or the set of labeled data candidates 106 from any suitable data structure (not shown), whether centralized and/or decentralized, and/or whether remote from and/or local to the receiver component 112. In any case, the receiver component 112 can electronically access the neural network 104 and/or the set of labeled data candidates 106, such that other components of the implicit curriculum learning system 102 can electronically manipulate and/or otherwise electronically interact with the neural network 104 and/or with the set of labeled data candidates 106.

In various embodiments, the implicit curriculum learning system 102 can comprise a training component 114. In various aspects, the training component 114 can electronically perform a training epoch on the neural network 104, based on the set of labeled data candidates 106. More specifically, the training component 114 can electronically execute the neural network 104 on each of the set of labeled data candidates 106, thereby yielding a set of outputted classifications. In various cases, the training component 114 can compute a set of machine learning losses based on the set of outputted classifications and based on the ground-truth classifications specified in the set of labeled data candidates 106. Accordingly, the training component 114 can electronically update internal parameters (e.g., weights, biases) of the neural network 104 via backpropagation and based on the set of machine learning losses. At such point, the training epoch can be considered as being complete and/or finished.

In various embodiments, the implicit curriculum learning system 102 can comprise a dropout component 116. In various aspects, the dropout component 116 can electronically modify and/or update the set of labeled data candidates 106. More specifically, as explained herein, the dropout component 116 can electronically prepare the set of labeled data candidates 106, so that a subsequent training epoch can be performed on the neural network 104 in a curriculum learning style and/or manner.

In various instances, the dropout component 116 can electronically identify a correctly-classified subset and an incorrectly-classified subset, based on the training component 114 completing and/or finishing the training epoch. In various cases, the correctly-classified subset can include labeled data candidates from the set of labeled data candidates 106 that were accurately classified by the neural network 104 during the training epoch. Conversely, the incorrectly-classified subset can include labeled data candidates from the set of labeled data candidates 106 that were inaccurately classified by the neural network 104 during the training epoch. In other words, the dropout component 116 can count and/or otherwise determine which particular labeled data candidates were properly analyzed by the neural network 104 during the training epoch and which particular labeled data candidates were improperly analyzed by the neural network 104 during the training epoch.

As mentioned above, in lieu of an explicit definition/metric for distinguishing easy-to-classify labeled data candidates from difficult-to-classify labeled data candidates, the classification accuracy of the neural network 104 can be used. Accordingly, the correctly-classified subset can be considered as representing those labeled data candidates which the neural network 104 found were easy to classify. Likewise, the incorrectly-classified subset can be considered as representing those labeled data candidates which the neural network 104 found were difficult to classify. As explained herein, the dropout component 116 can modify and/or update the set of labeled data candidates 106 so that more of the incorrectly-classified subset are represented and/or utilized in a subsequent training epoch and so that fewer of the correctly-classified subset are represented and/or utilized in a subsequent training epoch.

In various aspects, the dropout component 116 can evaluate and/or determine whether a training termination criterion has yet been satisfied by the neural network 104. In various instances, any suitable training termination criterion can be implemented. As an example, the training termination criterion can be a maximum number of training epochs to be performed on the neural network 104. As another example, the training termination criterion can be a minimized machine learning loss value to be attained by the neural network 104. As still another example, the training termination criterion can be based on a size of the correctly-classified subset and/or a size of the incorrectly-classified subset (e.g., training can continue until the neural network 104 correctly classifies at least a threshold proportion of a batch of labeled data candidates and/or until the neural network incorrectly classifies no more than a threshold proportion of a batch of labeled data candidates). In any case, if the dropout component 116 determines that the training termination criterion is not yet satisfied, the dropout component 116 can take the following actions.

In various aspects, the dropout component 116 can electronically determine and/or otherwise compute a dropout percentage. In various instances, the dropout percentage can be any suitable scalar having a magnitude between 0 and 1. In various cases, the dropout percentage can be a uniform constant. In other cases, the dropout percentage can be a function of the size of the correctly-classified subset and/or of the size of the incorrectly-classified subset. In still other cases, the dropout percentage can be a function of the total number of training epochs that are supposed to be performed on the neural network 104. In any case, the dropout component 116 can obtain the dropout percentage.

In various aspects, the dropout component 116 can electronically remove, eliminate, and/or otherwise delete a portion of the correctly-classified subset, which portion is equal to and/or within any suitable margin of the dropout percentage. Thus, if the dropout percentage is z percent for any suitable real number z between 0 and 100, exclusively, the dropout component 116 can electronically remove, eliminate, and/or delete z percent of the labeled data candidates that are in the correctly-classified subset. In other words, the dropout component 116 can shrink the size of the correctly-classified subset by z percent. However, the dropout component 116 can refrain from shrinking and/or otherwise altering the incorrectly-classified subset.

Thus, an updated set of labeled data candidates can be obtained, where the updated set of labeled data candidates is equivalent to the union between the incorrectly-classified subset and the shrunken correctly-classified subset. Accordingly, the updated set of labeled data candidates can contain fewer labeled data candidates than the set of labeled data candidates 106. Moreover, as explained above, the correctly-classified subset can be considered as representing the labeled data candidates which the neural network 104 found were easy to classify, and the incorrectly-classified subset can be considered as representing the labeled data candidates which the neural network 104 found were difficult to classify. Since the updated set of labeled data candidates can contain fewer of the easy-to-classify labeled data candidates, the updated set of labeled data candidates can be considered as being more difficult and/or more challenging for the neural network 104, as compared to the set of labeled data candidates 106.

Now, in various embodiments, the training component 114 can facilitate a new training epoch on the neural network 104, based on the updated set of labeled data candidates. Just as explained above, the dropout component 116 can then identify a new correctly-classified subset and a new incorrectly-classified subset, can check the training termination criterion, can determine and/or compute the dropout percentage, and can shrink the new correctly-classified subset by the dropout percentage, thereby yielding a twice-updated set of labeled data candidates that is even smaller and more difficult to classify than the updated set of labeled data candidates. More generally, the training component 114 can perform any suitable number of training epochs on the neural network 104, and the dropout component 116 can, after each training epoch, remove a dropout percentage of those labeled data candidates which the neural network 104 correctly classified during the most recent training epoch.

Thus, in this way, the implicit curriculum learning system 102 can perform curriculum learning on the neural network 104 without relying upon and/or otherwise requiring an explicit definition/metric to distinguish between easy-to-classify labeled data candidates and difficult-to-classify labeled data candidates.

Figure 2:
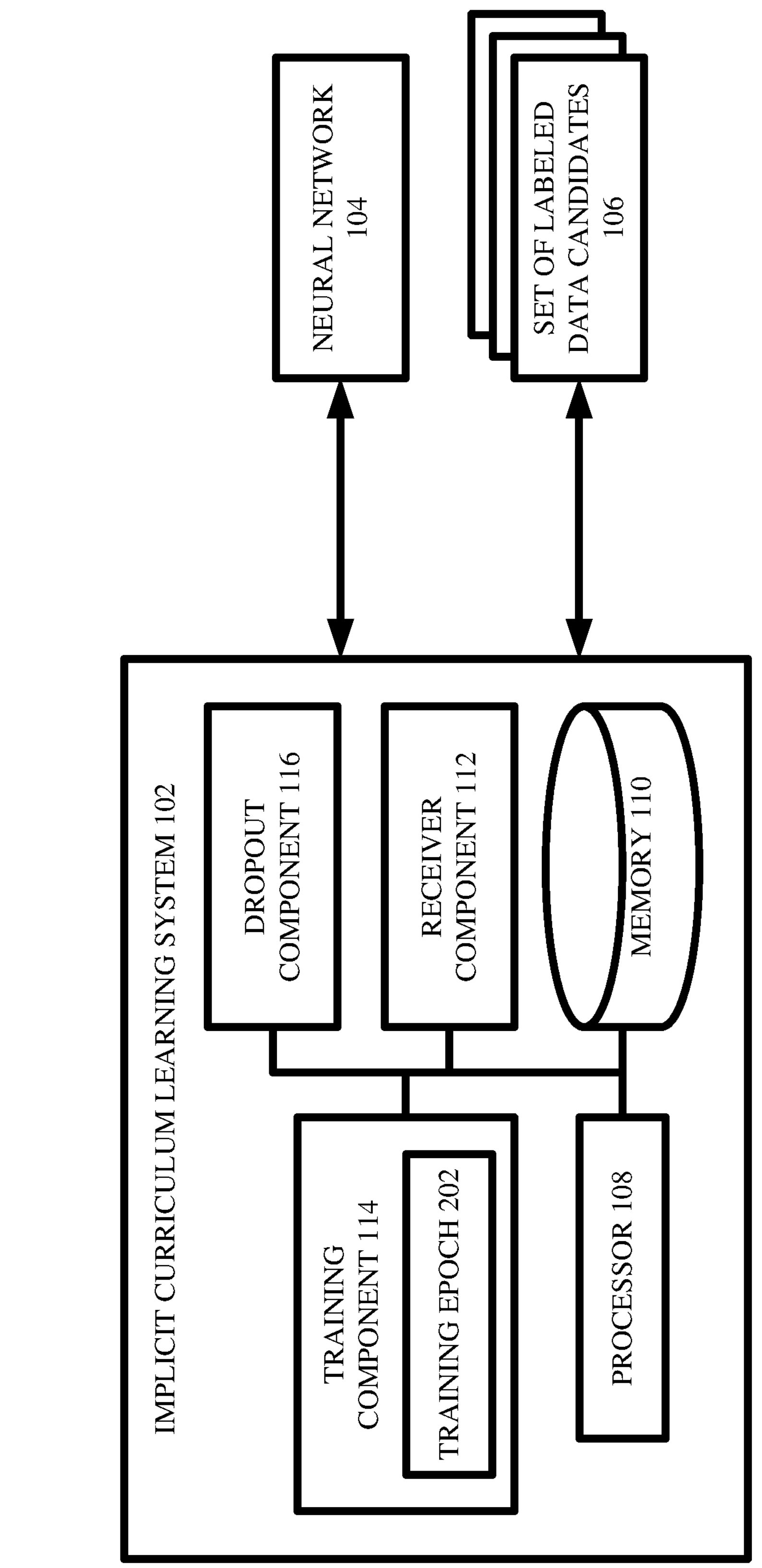
FIG. 2 illustrates a high-level block diagram of an example, non-limiting system including a training epoch that facilitates implicit curriculum learning in accordance with one or more embodiments described herein.

FIG. 2 illustrates a high-level block diagram of an example, non-limiting system 200 including a training epoch that can facilitate implicit curriculum learning in accordance with one or more embodiments described herein. As shown, the system 200 can, in some cases, comprise the same components as the system 100, and can further comprise a training epoch 202.

In various embodiments, the training component 114 can electronically perform the training epoch 202 on the neural network 104, by leveraging the set of labeled data candidates 106. More specifically, for each given labeled data candidate in the set of labeled data candidates 106, the training component 114 can input the given labeled data candidate into the neural network 104, which can cause the neural network 104 to produce a given output classification. In various instances, the training component 114 can compute an error between the given output classification and a ground-truth classification that corresponds to the given labeled data candidate. In various cases, the training component 114 can repeat this for each labeled data candidate in the set of labeled data candidates 106, thereby yielding a set of errors. In various aspects, the training component 114 can use the set of errors to facilitate backpropagation on the neural network 104, thereby updating the internal weights and/or biases of the neural network 104. In other words, the set of labeled data candidates 106 can be considered as a batch of training data used in the training epoch 202. In various cases, once the training component 114 has updated the neural network 104, the training epoch 202 can be considered as being complete and/or finished.

Figure 3:
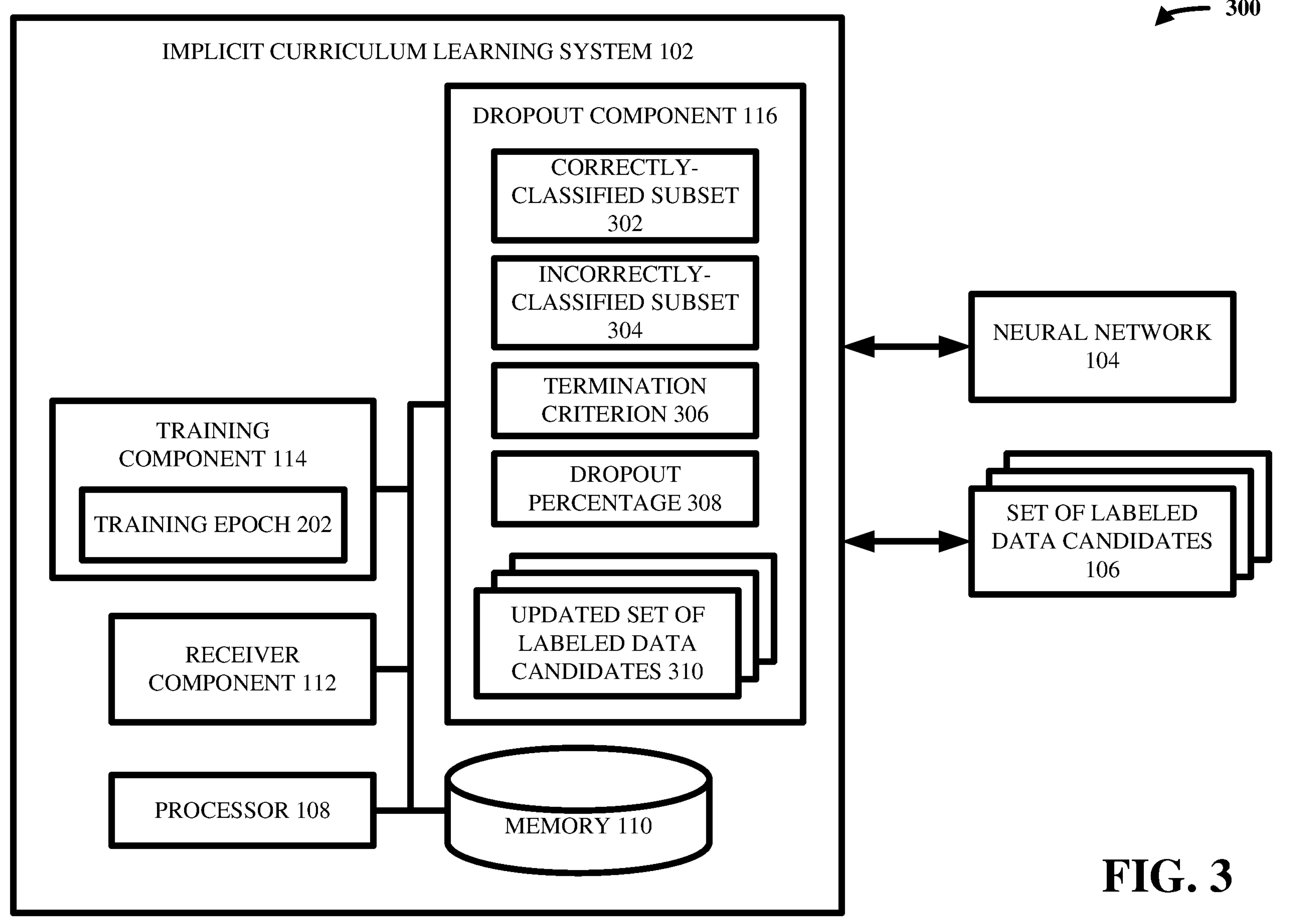
FIG. 3 illustrates a high-level block diagram of an example, non-limiting system including a correctly-classified subset, an incorrectly-classified subset, a termination criterion, a dropout percentage, and an updated set of labeled data candidates that facilitates implicit curriculum learning in accordance with one or more embodiments described herein.

FIG. 3 illustrates a high-level block diagram of an example, non-limiting system 300 including a correctly-classified subset, an incorrectly-classified subset, a termination criterion, a dropout percentage, and an updated set of labeled data candidates that can facilitate implicit curriculum learning in accordance with one or more embodiments described herein. As shown, the system 300 can, in some cases, comprise the same components as the system 200, and can further comprise a correctly-classified subset 302, an incorrectly-classified subset 304, a termination criterion 306, a dropout percentage 308, and/or an updated set of labeled data candidates 310.

In various embodiments, the dropout component 116 can electronically generate and/or identify the correctly-classified subset 302 and/or the incorrectly-classified subset 304, based on the training component 114 completing and/or finishing the training epoch 202. In various aspects, the correctly-classified subset 302 can be considered as containing all labeled data candidates that are both within the set of labeled data candidates 106 and that were accurately classified by the neural network 104 during the training epoch 202. Conversely, in various aspects, the incorrectly-classified subset 304 can be considered as containing all labeled data candidates that are both within the set of labeled data candidates 106 and that were not accurately classified by the neural network 104 during the training epoch 202. In other words, the dropout component 116 can initialize the correctly-classified subset 302 and the incorrectly-classified subset 304 as empty sets, and the dropout component 116 can iterate through each of the set of labeled data candidates 106 to compare the classifications assigned by the neural network 104 to the ground-truth classifications specified in the set of labeled data candidates 106. If the classification assigned to a given labeled data candidate by the neural network 104 matches the ground-truth classification of that given labeled data candidate, the dropout component can insert the given labeled data candidate into the correctly-classified subset 302. On the other hand, if the classification assigned to a given labeled data candidate by the neural network 104 does not match the ground-truth classification of that given labeled data candidate, the dropout component can insert the given labeled data candidate into the incorrectly-classified subset 304. In any case, the dropout component 116 can identify the correctly-classified subset 302 and the incorrectly-classified subset 304, where the union of the correctly-classified subset 302 and the incorrectly-classified subset 304 can be equivalent to the set of labeled data candidates 106.

As mentioned above, the inventors of various embodiments described herein recognized that the classification accuracy of the neural network 104 can be treated as an implicit metric/criterion by which to distinguish easy-to-classify labeled data candidates from difficult-to-classify labeled data candidates. Accordingly, the correctly-classified subset 302 can be considered as containing and/or including the labeled data candidates which the neural network 104 found were easy to classify during the training epoch 202, whereas the incorrectly-classified subset 304 can be considered as containing and/or including the labeled data candidates which the neural network 104 found were difficult to classify during the training epoch 202.

In various aspects, the dropout component 116 can electronically access in any suitable fashion the termination criterion 306 and can electronically determine whether training of the neural network 104 should continue or cease by checking whether the termination criterion 306 has been satisfied by the training epoch 202. In various instances, the termination criterion 306 can be any suitable criterion. For example, in some cases, the termination criterion 306 can specify a maximum number of training epochs that are desired to be performed on the neural network 104. In such case, the dropout component 116 can determine that training of the neural network 104 should continue if the training epoch 202 did not cause the maximum number of desired training epochs to be reached, and the dropout component 116 can determine that training of the neural network 104 should cease if the training epoch 202 did not cause the maximum number of desired training epochs to be reached.

As another example, in some cases, the termination criterion 306 can be a minimum error level that is desired to be achieved by the neural network 104. In such case, the dropout component 116 can determine that training of the neural network 104 should continue if the average error level of the neural network 104 during the training epoch 202 was above the minimum error level, and the dropout component 116 can determine that training of the neural network 104 should cease if the average error level of the neural network 104 during the training epoch 202 was at and/or below the minimum error level.

As yet another example, in some cases, the termination criterion 306 can be any suitable function of the size of the correctly-classified subset 302 and/or the size of the incorrectly-classified subset 304. For instance, the dropout component 116 can determine that training of the neural network 104 should continue if the size of the correctly-classified subset 302 is below any suitable threshold value (e.g., if the neural network 104 accurately classified insufficiently many labeled data candidates during the training epoch 202), and the dropout component 116 can determine that training of the neural network 104 should cease if the size of the correctly-classified subset 302 is above the threshold value (e.g., if the neural network 104 accurately classified sufficiently many labeled data candidates during the training epoch 202). As another example, the dropout component 116 can determine that training of the neural network 104 should continue if the size of the incorrectly-classified subset 304 is above any suitable threshold value (e.g., if the neural network 104 inaccurately classified too many labeled data candidates during the training epoch 202), and the dropout component 116 can determine that training of the neural network 104 should cease if the size of the incorrectly-classified subset 304 is below the threshold value (e.g., if the neural network 104 inaccurately classified sufficiently few labeled data candidates during the training epoch 202). In other embodiments, the termination criterion 306 can be based on a ratio between the size of the correctly-classified subset 302 and the size of the incorrectly-classified subset 304.

In various aspects, based on determining that training of the neural network 104 should continue, the dropout component 116 can electronically access and/or electronically calculate the dropout percentage 308. In various instances, the dropout percentage 308 can be any suitable real-valued scalar that has a magnitude that is greater than 0 and less than 1. In various cases, the value of the dropout percentage 308 can be a constant that is independent the size of the correctly-classified subset 302 and/or the size of the incorrectly-classified subset 304. In other cases, the value of the dropout percentage 308 can be any suitable function of the size of the correctly-classified subset 302 and/or the size of the incorrectly-classified subset 304. For example, the value of the dropout percentage 308 can vary inversely with a ratio between the size of the incorrectly-classified subset 304 (e.g., numerator) and the size of the correctly-classified subset 302 (e.g., denominator). In such case, the value of the dropout percentage 308 can asymptotically approach 1 as the size of the incorrectly-classified subset 304 decreases and/or as the size of the correctly-classified subset 302 increases. Likewise, in such case, the value of the dropout percentage 308 can asymptotically approach 0 as the size of the incorrectly-classified subset 304 increases and/or as the size of the correctly-classified subset 302 decreases. As those having ordinary skill in the art will appreciate, such inverse proportionality can be achieved by making the dropout percentage 308 equal to and/or otherwise based on a sigmoid-type function (e.g., sigmoid, softmax, arctangent) that takes as arguments the size of the correctly-classified subset 302 and/or the size of the incorrectly-classified subset 304. In still other cases, the value of the dropout percentage 308 can be any suitable function of the maximum number of training epochs that are desired to be performed on the neural network 104. More specifically, the dropout percentage 308 can vary inversely with the maximum number of training epochs that are desired to be performed on the neural network 104. In such case, the value of the dropout percentage 308 can asymptotically approach 1 as the maximum number of training epochs to be performed decreases, and the value of the dropout percentage 308 can asymptotically approach 0 as the maximum number of training epochs to be performed increases. Those having ordinary skill in the art will appreciate that the dropout percentage 308 can be any suitable function of any other suitable arguments, as desired.

In various embodiments, the dropout component 116 can electronically shrink and/or reduce the size of the correctly-classified subset 302 by the dropout percentage 308. In other words, the dropout percentage 308 can represent a proportion of the correctly-classified subset 302 that is to be removed, eliminated, and/or otherwise deleted by the dropout component 116. For example, if the value of the dropout percentage 308 is equal to 45%, the dropout component 116 can remove, eliminate, and/or delete 45% of the labeled data candidates that are in the correctly-classified subset 302. In various cases, the specific labeled data candidates that are removed, eliminated, and/or deleted from the correctly-classified subset 302 can be chosen and/or selected randomly and/or in any other suitable fashion by the dropout component 116. In any case, the result can be that the correctly-classified subset 302 has been shrunk and/or reduced in size by the dropout percentage 308. Note, however, that the dropout component 116 can refrain from shrinking and/or reducing the size of the incorrectly-classified subset 304.

In various aspects, the updated set of labeled data candidates 310 can be equivalent to the union of the incorrectly-classified subset 304 and the reduced/shrunken correctly-classified subset 302. Accordingly, the updated set of labeled data candidates 310 can be smaller in size than the set of labeled data candidates 106. Moreover, as mentioned above, the correctly-classified subset 302 can be interpreted as representing those labeled data candidates which the neural network 104 deemed easy to classify, while the incorrectly-classified subset 304 can be interpreted as representing those labeled data candidates which the neural network 104 deemed difficult to classify. Thus, since the dropout component 116 reduced/shrunk the size of the correctly-classified subset 302 by the dropout percentage 308, the updated set of labeled data candidates 310 can include a lesser proportion of easy-to-classify data candidates than the set of labeled data candidates 106, and can include a greater proportion of difficult-to-classify data candidates than the set of labeled data candidates 106. In other words, the updated set of labeled data candidates 310 can be considered and/or interpreted as being more challenging for the neural network 104 to classify than the set of labeled data candidates 106.

In various instances, the training component 114 can perform a new training epoch (not shown) on the neural network 104. However, this new training epoch can be based on the updated set of labeled data candidates 310, rather than on the set of labeled data candidates 106. Once the new training epoch is completed and/or finished, the dropout component 116 can repeat the above-described functionalities (e.g., can identify a new correctly-classified subset for the new training epoch, can identify a new incorrectly-classified subset for the new training epoch, can check the termination criterion 306, can obtain and/or compute the dropout percentage 308, and/or can reduce/shrink the size of the new correctly-classified subset by the dropout percentage 308, thereby yielding a new updated set of labeled data candidates that is smaller and more challenging than the updated set of labeled data candidates 310). More generally, the training component 114 can perform any suitable number of training epochs on the neural network 104 based on the set of labeled data candidates 106, and the dropout component 116 can iteratively update the set of labeled data candidates 106 after each training epoch, such that the set of labeled data candidates 106 can be considered as becoming progressively smaller and more difficult to classify with each training epoch.

Figure 4:
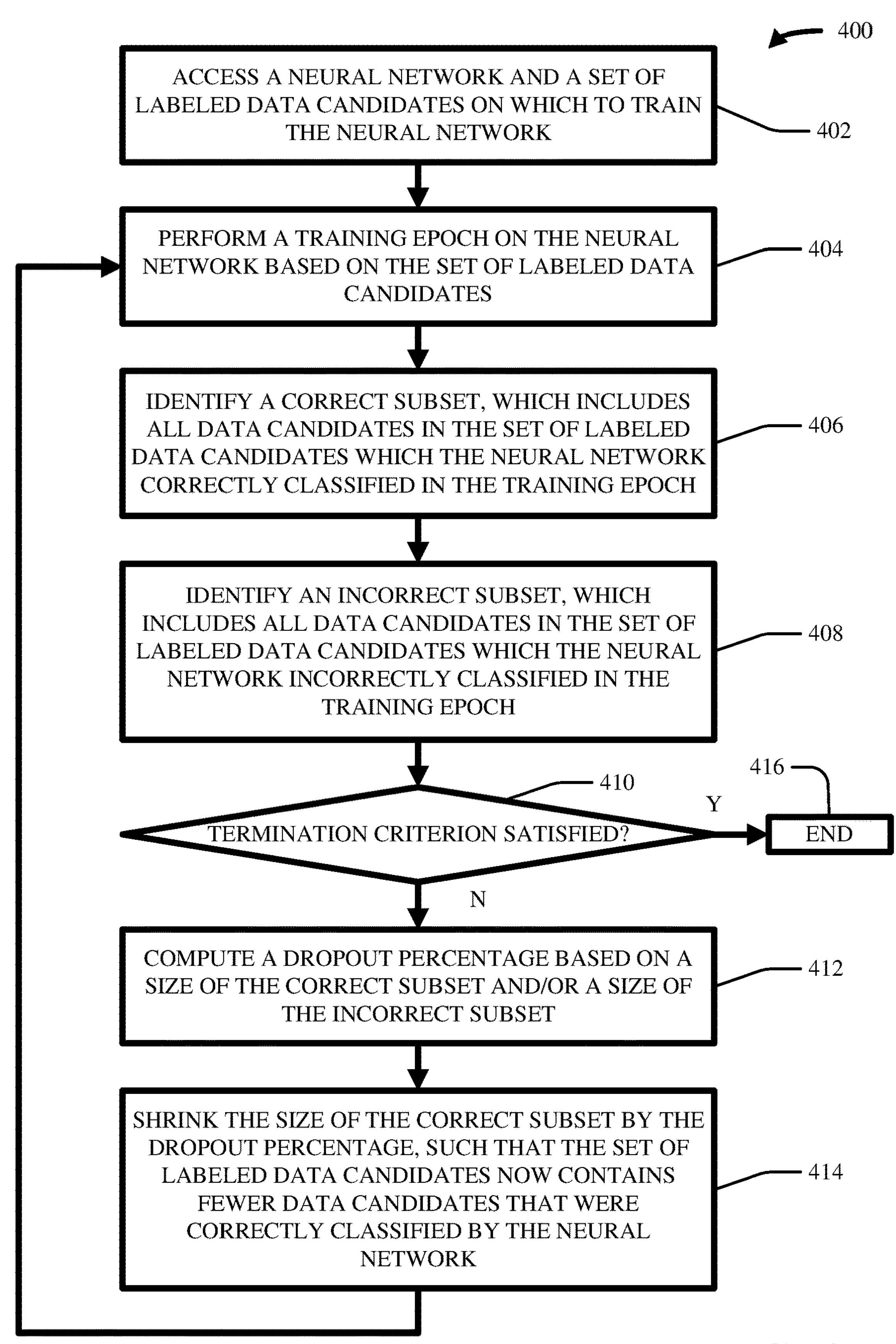
FIG. 4 illustrates a high-level flow diagram of an example, non-limiting computer-implemented method that facilitates implicit curriculum learning in accordance with one or more embodiments described herein.

FIG. 4 illustrates a high-level flow diagram of an example, non-limiting computer-implemented method 400 that can facilitate implicit curriculum learning in accordance with one or more embodiments described herein. In various cases, the computer-implemented method 400 can be facilitated by the implicit curriculum learning system 102.

In various embodiments, act 402 can include accessing, by a computer system (e.g., 112) comprising a processor, a neural network (e.g., 104) and a set of labeled data candidates (e.g., 106) on which to train the neural network. For example, the computer system can electronically receive and/or retrieve the neural network and/or the set of labeled data candidates from any suitable database and/or data structure that is electronically accessible to the computer system.

In various aspects, act 404 can include performing, by the computer system (e.g., 114), a training epoch (e.g., 202) on the neural network based on the set of labeled data candidates. For example, the computer system can execute the neural network on each of the set of labeled data candidates, can compute error/losses based on such executions, and can backpropagate such errors/losses so as to iteratively update the internal parameters of the neural network.

In various instances, act 406 can include identifying, by the computer system (e.g., 116), a correct subset (e.g., 302), which includes all data candidates in the set of labeled data candidates which the neural network correctly classified in the training epoch. In other words, the computer system can determine the identities of the specific data candidates for which the neural network outputted accurate classifications during the training epoch.

In various aspects, act 408 can include identifying, by the computer system (e.g., 116), an incorrect subset (e.g., 304), which includes all data candidates in the set of labeled data candidates which the neural network incorrectly classified in the training epoch. In other words, the computer system can determine the identities of the specific data candidates for which the neural network outputted inaccurate classifications during the training epoch.

In various instances, act 410 can include determining, by the computer system (e.g., 116), whether a termination criterion (e.g., 306) has been satisfied by the training epoch. If so, the computer-implemented method 400 can proceed to act 416, at which point the computer-implemented method 400 can end. If not, the computer-implemented method 400 can proceed to act 412.

In various aspects, act 412 can include computing, by the computer system (e.g., 116), a dropout percentage (e.g., 308) based on a size of the correct subset and/or a size of the incorrect subset. That is, the dropout percentage can be any suitable function of the size of the correct subset and/or a size of the incorrect subset. For instance, the dropout percentage can vary inversely with a ratio between the size of the incorrect subset and the size of the correct subset.

In various instances, act 414 can include shrinking, by the computer system (e.g., 116), the correct subset by the dropout percentage, such that the set of labeled data candidates now contains fewer data candidates that were correctly classified by the neural network. In other words, the computer system can remove, eliminate, and/or delete from the set of labeled data candidates a proportion of data candidates which the neural network accurately classified, where such proportion can be equal to and/or within any suitable rounding margin of the dropout percentage. In various cases, the computer-implemented method 400 can proceed back to act 404.

As shown, the computer-implemented method 400 can iterate through acts 404-414 until the termination criterion is satisfied, where the set of labeled data candidates becomes smaller and more challenging to classify with each iteration (e.g., with each training epoch).

FIG. 5 illustrates example, non-limiting tables 500 showing how implicit curriculum learning can cause a training dataset to become progressively smaller and more difficult to classify in accordance with one or more embodiments described herein.

FIG. 5 depicts a table 502 and a table 504. In various cases, the table 502 can illustrate how the size of the set of labeled data candidates 106 progressively decreases with each training epoch when the dropout percentage 308 is constant and/or uniform across training epochs. As shown in the table 502, when a training epoch 1 (e.g., a first training epoch) is performed by the training component 114, the size of the set of labeled data candidates 106 can be at any suitable initial positive integer value $N_1$. After the training epoch 1, the dropout component 116 can update the set of labeled data candidates 106 via the dropout percentage 308, such that the size of the set of labeled data candidates 106 is now $N_2$. In other words, if the training epoch 202 is the training epoch 1, then $N_1$ can be the size of the set of labeled data candidates 106 and $N_2$ can be the size of the updated set of labeled data candidates 310. In various instances, it can be the case that $N_2=\text{Incorrect}_1+\text{Correct}_1*(1-P_{Drop})$, where $\text{Incorrect}_1$ represents the total number of labeled data candidates which the neural network 104 inaccurately classified during the training epoch 1, where $\text{Correct}_1$ represents the total number of labeled data candidates which the neural network 104 accurately classified during the training epoch 1, and where $P_{Drop}$ represents the value of the dropout percentage 308. That is, if the training epoch 202 is the training epoch 1, then $\text{Incorrect}_1$ can be the size of the incorrectly-classified subset 304, and $\text{Correct}_1$ can be the size of the correctly-classified subset 302. As shown, $0<P_{Drop}<1$, and $\text{Incorrect}_1+\text{Correct}_1=N_1$. Accordingly, it is clear to see that $N_2<N_1$. Moreover, because $N_2$ was formed by removing, eliminating, and/or deleting some correctly-classified, and thus easy-to-classify, data candidates from $N_1$, it can be the case that $N_2$ contains a larger proportion of difficult-to-classify data candidates than $N_1$, meaning that $N_2$ can be considered as harder and/or more challenging that $N_1$. Accordingly, a training epoch 2 (e.g., a second training epoch) can be performed on the updated set $N_2$. In other words, the updated set of labeled data candidates 310 can be considered and/or treated as the set of labeled data candidates 106 for the next and/or subsequent training epoch. In still other words, the size of the set of labeled data candidates 106 can now be considered as being $N_2$ rather than $N_1$.

As shown in the table 502, after the training epoch 2 is performed by the training component 114, the dropout component 116 can again update the set of labeled data candidates 106 via the dropout percentage 308, such that the size of the set of labeled data candidates 106 is now $N_3$ rather than $N_2$. In other words, if the training epoch 202 is the training epoch 2, then $N_2$ can be the size of the set of labeled data candidates 106 and $N_3$ can be the size of the updated set of labeled data candidates 310. In various instances, it can be the case that $N_3=\text{Incorrect}_2+\text{Correct}_2*(1-P_{Drop})$, where $\text{Incorrect}_2$ represents the total number of labeled data candidates which the neural network 104 inaccurately classified during the training epoch 2, where $\text{Correct}_2$ represents the total number of labeled data candidates which the neural network 104 accurately classified during the training epoch 2, and where $P_{Drop}$ represents the value of the dropout percentage 308. That is, if the training epoch 202 is the training epoch 2, then $Incorrect_2$ can be the size of the incorrectly-classified subset 304, and $Correct_2$ can be the size of the correctly-classified subset 302. As shown, $0<P_{Drop}<1$, and $Incorrect_2+Correct_2=N_2$. Accordingly, it is clear to see that $N_3<N_2$. Moreover, because $N_3$ was formed by removing, eliminating, and/or deleting some correctly-classified, and thus easy-to-classify, data candidates from $N_2$, it can be the case that $N_3$ contains a larger proportion of difficult-to-classify data candidates than $N_2$, meaning that $N_3$ can be considered as harder and/or more challenging that $N_2$. Accordingly, a training epoch 3 (e.g., a third training epoch) can be performed on the updated set $N_3$. In other words, the updated set of labeled data candidates 310 can be considered and/or treated as the set of labeled data candidates 106 for the next and/or subsequent training epoch. In still other words, the size of the set of labeled data candidates 106 can now be considered as being $N_3$ rather than $N_2$.

More generally, as shown in the table 502, a training epoch x, for any suitable positive integer x, can be performed when the size of the set of labeled data candidates 106 is equal to $N_x=Incorrect_{x-1}+Correct_{x-1}*(1-P_{Drop})$, where $0<P_{Drop}<1$, and $Incorrect_{x-1}+Correct_{x-1}=N_{x-1}$.

In like fashion, the table 504 can illustrate how the size of the set of labeled data candidates 106 progressively decreases with each training epoch when the dropout percentage 308 is variable across training epochs. As shown, the table 504 is analogous to the table 502, with the main difference being that the dropout percentage 308 is uniform/constant in the table 502 and is not uniform/constant in the table 504. As shown in the table 504, to facilitate a training epoch x, for any suitable positive integer x, the value of the dropout percentage 308 which the dropout component 116 computes can be $0<P_{Drop_{x-1}}=f(Incorrect_{x-1}, Correct_{x-1})<1$. In other words, the dropout percentage 308 can be any suitable mathematical function of the size of the incorrectly-classified subset 304 (e.g., $Incorrect_{x-1}$) and the size of the correctly-classified subset 302 (e.g., $Correct_{x-1}$) that is bounded by both 0 and 1. In this way, the dropout component 116 can compute a new value for the dropout percentage 308 after and/or before each training epoch.

Figure 6:
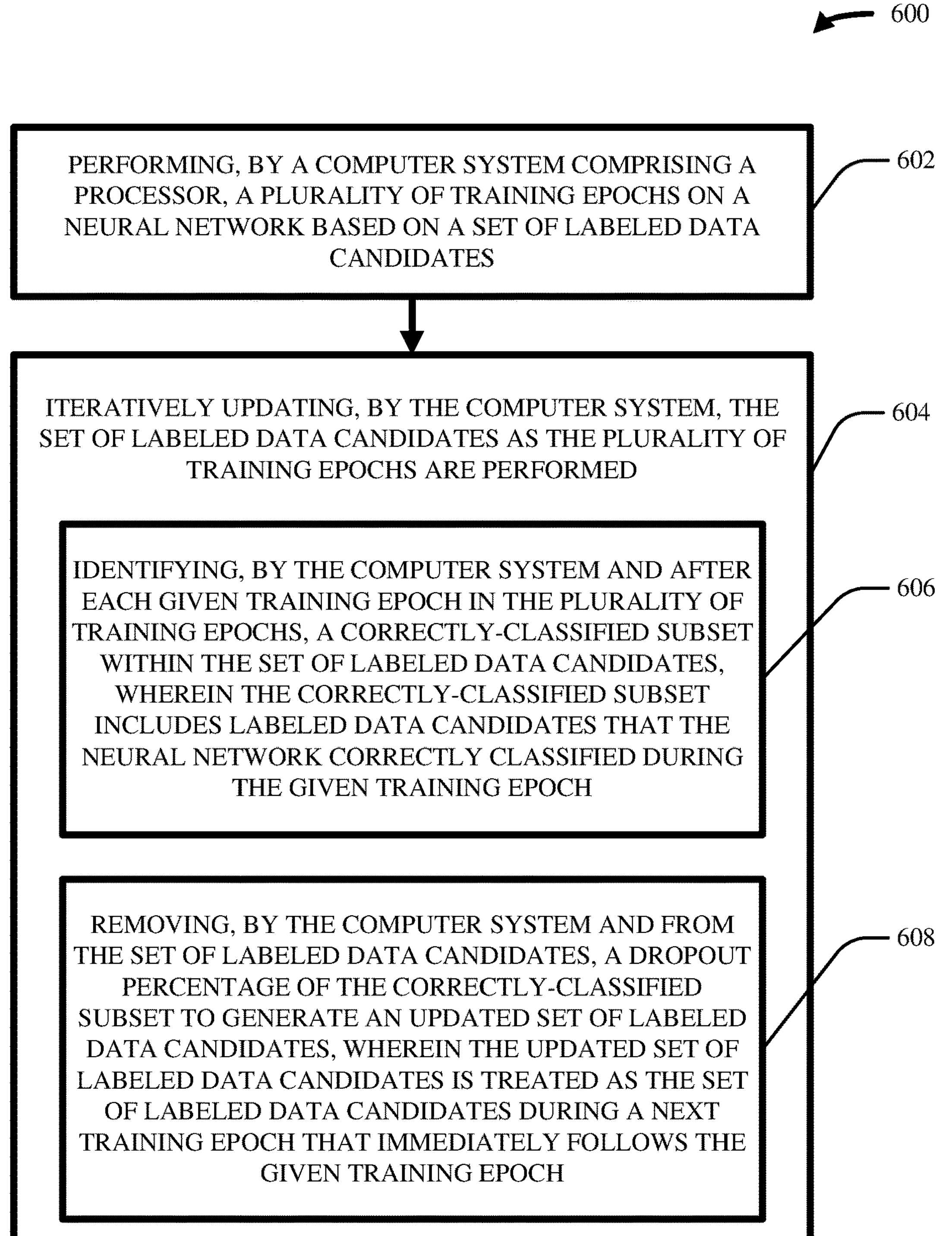
FIG. 6 illustrates a high-level flow diagram of an example, non-limiting computer-implemented method that facilitates implicit curriculum learning in accordance with one or more embodiments described herein.

FIG. 6 illustrates a high-level flow diagram of an example, non-limiting computer-implemented method 600 that can facilitate implicit curriculum learning in accordance with one or more embodiments described herein. In various cases, the computer-implemented method 600 can be facilitated by the implicit curriculum learning system 102.

In various embodiments, act 602 can include performing, by a computer system (e.g., 114) comprising a processor, a plurality of training epochs (e.g., plurality of 202) on a neural network (e.g., 104) based on a set of labeled data candidates (e.g., 106). In various cases, as explained herein, each training epoch can include executing the neural network on a batch of labeled data candidates and updating, via backpropagation, the internal weights and/or biases of the neural network based on such execution.

In various aspects, act 604 can include iteratively updating, by the computer system (e.g., 116), the set of labeled data candidates as the plurality of training epochs are performed. In various cases, act 604 can include and/or comprise sub-act 606 and/or sub-act 608.

In various instances, sub-act 606 can include identifying, by the computer system (e.g., 116) and after each given training epoch (e.g., 202) in the plurality of training epochs, a correctly-classified subset (e.g., 302) within the set of labeled data candidates, wherein the correctly-classified subset includes labeled data candidates that the neural network correctly classified during the given training epoch. In other words, the computer system can tabulate and/or keep track of which specific data candidates were accurately classified by the neural network during the given training epoch, and such specific data candidates can collectively be considered as the correctly-classified subset.

In various aspects, sub-act 608 can include removing, by the computer system (e.g., 116) and from the set of labeled data candidates, a dropout percentage (e.g., 308) of the correctly-classified subset to generate an updated set of labeled data candidates (e.g., 310), wherein the updated set of labeled data candidates is treated as the set of labeled data candidates during a next training epoch that immediately follows the given training epoch. In other words, the computer system can delete a proportion of the correctly-classified subset, where such proportion is equal to and/or within any suitable rounding margin of the dropout percentage. As a result of deletion, the set of labeled data candidates can now contain fewer labeled data candidates. Thus, the set of labeled data candidates can be considered as being updated by such deletion, and a subsequent training epoch can be performed on the neural network using the updated set of labeled data candidates.

Although not explicitly shown in FIG. 6, act 604 can further include: identifying, by the computer system (e.g., 116) and after the given training epoch, an incorrectly-classified subset (e.g., 304) within the set of labeled data candidates, wherein the incorrectly-classified subset includes labeled data candidates that the neural network incorrectly classified during the given training epoch, and wherein the updated set of labeled data candidates includes an entirety of the incorrectly-classified subset. In other words, the computer system can tabulate and/or keep track of which specific data candidates were inaccurately classified by the neural network during the given training epoch, such specific data candidates can collectively be considered as the incorrectly-classified subset, and it can be the case that none of such specific data candidates can be deleted from the set of labeled data candidates.

Although not explicitly shown in FIG. 6, the dropout percentage can be based on a ratio of the size of the incorrectly-classified subset to the size of the correctly-classified subset. For example, the dropout percentage can vary inversely with the ratio of the size of the incorrectly-classified subset to the size of the correctly-classified subset.

Although not explicitly shown in FIG. 6, the computer-implemented method 600 can further comprise: ceasing, by the computer system (e.g., 114), to perform the plurality of training epochs and ceasing, by the computer system (e.g., 114), to iteratively update the set of labeled data candidates, based on determining (e.g., via 116) that a size of the incorrectly-classified subset is below a minimum threshold.

Although not explicitly shown in FIG. 6, the computer-implemented method 600 can further comprise: ceasing, by the computer system (e.g., 114), to perform the plurality of training epochs and ceasing, by the computer system (e.g., 116), to iteratively update the set of labeled data candidates, based on determining (e.g., via 116) that a ratio of a size of the incorrectly-classified subset to a size of the correctly-classified subset is below a minimum threshold.

Although not explicitly shown in FIG. 6, the dropout percentage can vary inversely with a total number of training epochs in the plurality of training epochs.

Although not explicitly shown in FIG. 6, the iteratively updating the set of labeled data candidates can cause, without manual intervention, the set of labeled data candidates to become progressively smaller and more difficult to label as the plurality of training epochs are performed. This can cause the neural network to learn how to handle and/or label difficult candidates without forgetting how to label easy data candidates.

Although not explicitly shown in FIG. 6, each data candidate in the set of labeled data candidates can be an electronic and/or online transaction that is labeled as either fraudulent or non-fraudulent.

Although the herein disclosure mainly describes embodiments where the neural network 202 is configured to classify inputted data candidates, this is a mere non-limiting example. Those having ordinary skill in the art will appreciate that they herein-described teachings can be applied to any suitable neural network that is configured to receive any suitable input data (e.g., input images, input sound recordings, input transaction data) and that is configured to generate any suitable output data (e.g., classifications, segmentations, forecasts). Indeed, the herein-described teachings can even be implemented in cases where the neural network 104 is configured to generate continuously-variable output (e.g., in such cases, any suitable threshold value can be used as a cut-off between acceptable/correct continuous values and unacceptable/incorrect continuous values).

Various embodiments described herein include a computerized tool (e.g., 102) that can facilitate automatic curriculum learning of a neural network (e.g., 104), without requiring and/or relying upon an explicit, objective definition that distinguishes easy data candidates from difficult data candidates. Such a computerized tool functions by performing a plurality of training epochs on the neural network based on a set of labeled data candidates, and iteratively updating the set of labeled data candidates after each training epoch. More specifically, after each training epoch, the computerized tool can remove, eliminate, and/or delete from the set of labeled data candidates a dropout percentage of those labeled data candidates which the neural network accurately analyzed during the most recent training epoch. This can cause the set of labeled data candidates to get progressively smaller and harder to analyze as more training epochs are performed.

Those having ordinary skill in the art will appreciate that the herein disclosure describes non-limiting examples of various embodiments of the subject innovation. For ease of description and/or explanation, various portions of the herein disclosure utilize the term “each” when discussing various embodiments of the subject innovation. Those having ordinary skill in the art will appreciate that such usages of the term “each” are non-limiting examples. In other words, when the herein disclosure provides a description that is applied to “each” of some particular computerized object and/or component, it should be understood that this is a non-limiting example of various embodiments of the subject innovation, and it should be further understood that, in various other embodiments of the subject innovation, it can be the case that such description applies to fewer than “each” of that particular computerized object.

Figure 7:
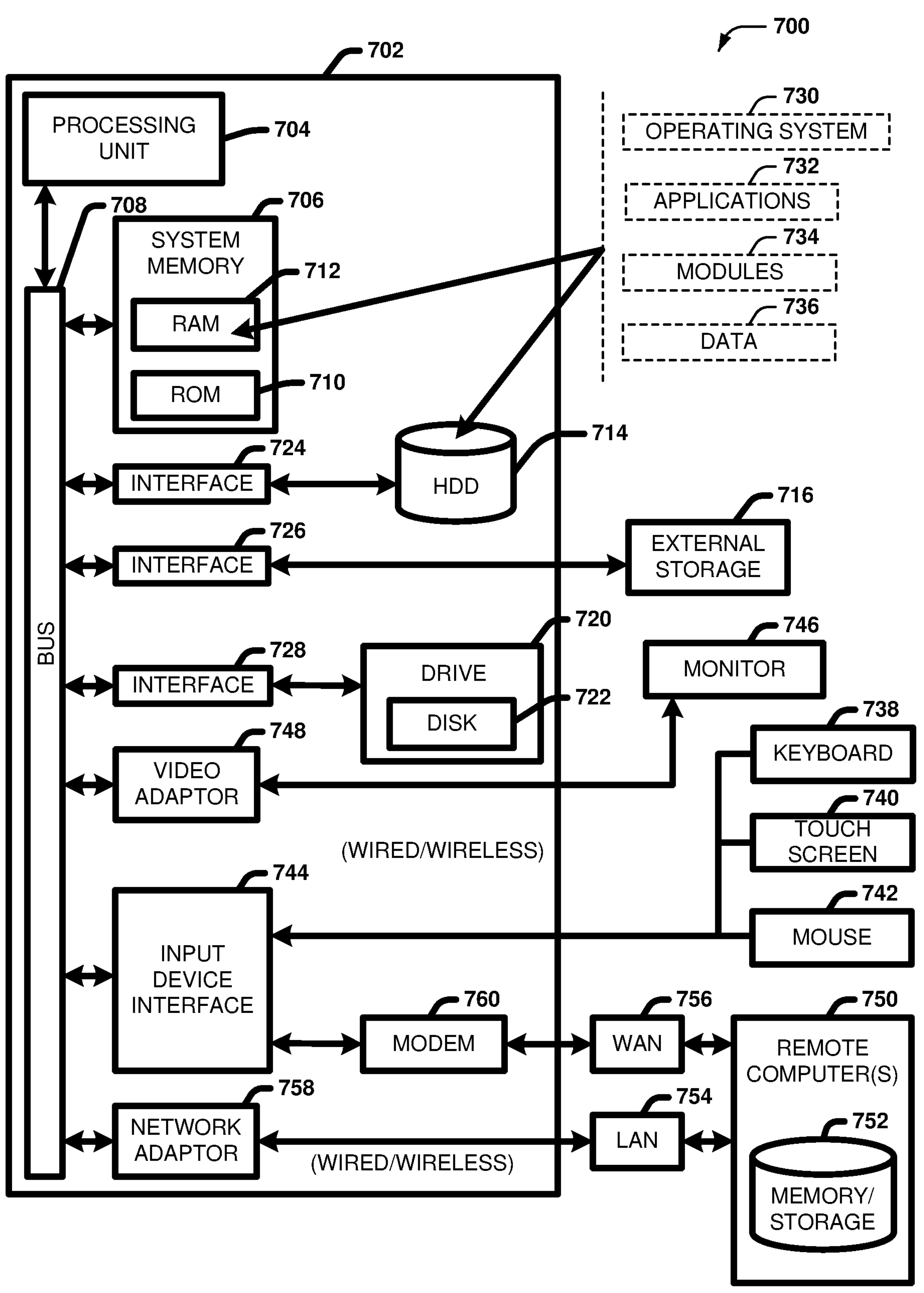
FIG. 7 illustrates a block diagram of an example, non-limiting operating environment in which one or more embodiments described herein can be facilitated.

In order to provide additional context for various embodiments described herein, FIG. 7 and the following discussion are intended to provide a brief, general description of a suitable computing environment 700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms “tangible” or “non-transitory” herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term “modulated data signal” or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also include a high-speed RAM such as static RAM for caching data.

The computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and a drive 720, e.g., such as a solid state drive, an optical disk drive, which can read or write from a disk 722, such as a CD-ROM disc, a DVD, a BD, etc. Alternatively, where a solid state drive is involved, disk 722 would not be included, unless separate. While the internal HDD 714 is illustrated as located within the computer 702, the internal HDD 714 can also be configured for external use in a suitable chassis (not shown). Additionally, while not shown in environment 700, a solid state drive (SSD) could be used in addition to, or in place of, an HDD 714. The HDD 714, external storage device(s) 716 and drive 720 can be connected to the system bus 708 by an HDD interface 724, an external storage interface 726 and a drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently certain or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can be enable with a security module, such as a trusted processing module (TPM). For instance with a TPM, boot components hash next in time boot components, and wait for a match of results to secured values, before loading a next boot component. This process can take place at any layer in the code execution stack of computer 702, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 708 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the Internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the Internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above, such as but not limited to a network virtual machine providing one or more aspects of storage or processing of information. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 8 is a schematic block diagram of a sample computing environment 800 with which the disclosed subject matter can interact. The sample computing environment 800 includes one or more client(s) 810. The client(s) 810 can be hardware and/or software (e.g., threads, processes, computing devices). The sample computing environment 800 also includes one or more server(s) 830. The server(s) 830 can also be hardware and/or software (e.g., threads, processes, computing devices). The servers 830 can house threads to perform transformations by employing one or more embodiments as described herein, for example. One possible communication between a client 810 and a server 830 can be in the form of a data packet adapted to be transmitted between two or more computer processes. The sample computing environment 800 includes a communication framework 850 that can be employed to facilitate communications between the client(s) 810 and the server(s) 830. The client(s) 810 are operably connected to one or more client data store(s) 820 that can be employed to store information local to the client(s) 810. Similarly, the server(s) 830 are operably connected to one or more server data store(s) 840 that can be employed to store information local to the servers 830.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to various embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor; and a non-transitory computer-readable medium having stored thereon computer-executable instructions that are executable by the system to cause the system to perform operations comprising:

accessing, by the processor, a neural network and a set of labeled data candidates based on a first electronic activity of a plurality of users, at least some of the set of labeled data candidates representative of anomalous activity;

performing, by the processor, a plurality of training epochs on the neural network based on the set of labeled data candidates and an implicit metric to provide a trained neural network, wherein the implicit metric is based on a classification accuracy of the set of labeled data candidates at each training epoch, wherein performing the plurality of training epochs comprises:

iteratively updating the set of labeled data candidates as each training epoch of the plurality of training epochs is performed, by:

initializing a correctly-classified subset and an incorrectly-classified subset as empty sets;

identifying, after each given training epoch in the plurality of training epochs, the correctly-classified subset and the incorrectly-classified subset within the set of labeled data candidates based on the classification accuracy of a given data candidate, wherein, for the given data candidate, the identification comprises:

in response to the classification by the neural network matching a ground-truth classification, allocate the given data candidate to the correctly-classified subset, and in response to the classification by the neural network not matching the ground-truth classification, allocate the given data candidate to the incorrectly-classified subset;

removing, from the set of labeled data candidates after each given training epoch, a dropout percentage of the correctly-classified subset to generate an updated set of labeled data candidates, wherein the updated set of labeled data candidates includes an entirety of the incorrectly-classified subset, wherein the dropout percentage is configured to modify the updated set of labeled data candidates such that more data candidates of the incorrectly-classified subset are represented in a next training epoch relative to data candidates in the correctly-classified subset, and wherein the updated set of labeled data candidates is treated as the set of labeled data candidates during the next training epoch that immediately follows the given training epoch; and wherein, at each given training epoch, the neural network training is performed using a backpropagation algorithm based on a set of errors/losses determined for each given labeled data candidate of the set of labeled data candidates according to the classification by the neural network and the ground-truth classification to generate a given trained neural network, and wherein the given trained neural network is utilized as the neural network during the next training epoch; and determining, by the trained neural network, anomalous activity in the system based on data representative of a second electronic activity of the plurality of users, wherein the trained neural network is output based on the plurality of training epochs and a training termination criterion, the training termination criterion being based on a size of the incorrectly-classified subset at each given training epoch.

2. The system of claim 1, wherein the iterative updating of the set of labeled data candidates causes, without manual intervention, the set of labeled data candidates to become progressively smaller after each training epoch, and wherein each successive set of labeled data candidates comprises a higher ratio of incorrectly-classified candidates compared to correctly-classified candidates as the plurality of training epochs are performed.

3. The system of claim 1, wherein the operations further comprise:

computing the dropout percentage based on a size of the correctly-classified subset or the size of the incorrectly-classified subset.

4. The system of claim 1, wherein the operations further comprise:

computing the dropout percentage based on a total number of training epochs in the plurality of training epochs.

5. The system of claim 1, wherein the operations further comprise:

ceasing to perform the plurality of training epochs and ceasing to iteratively update the set of labeled data candidates, once the training termination criterion has been reached.

6. The system of claim 5, wherein the training termination criterion is based on a size of the correctly-classified subset or the size of the incorrectly-classified subset.

7. The system of claim 1, wherein each data candidate in the set of labeled data candidates is an electronic transaction that is labeled as either fraudulent or non-fraudulent.

8. A computer-implemented method, comprising:

performing, by a computer system comprising a processor, a plurality of training epochs on a neural network to output a trained neural network based on a set of labeled data candidates representative of electronic activity of a plurality of users and an implicit metric, the implicit metric being based on a classification accuracy of the electronic activity as anomalous activity at each epoch based on the set of labeled data candidates;

iteratively updating, by the computer system, the set of labeled data candidates as the plurality of training epochs are performed, wherein the iteratively updating includes:

initializing a correctly-classified subset and an incorrectly-classified subset as empty sets;

identifying, by the computer system and after each given training epoch in the plurality of training epochs, the correctly-classified subset and the incorrectly-classified subset within the set of labeled data candidates, wherein the correctly-classified subset includes labeled data candidates allocated thereto that the neural network correctly classified as corresponding to anomalous activity during the given training epoch;

removing, by the computer system and from the set of labeled data candidates, a dropout percentage of the correctly-classified subset to generate an updated set of labeled data candidates, wherein the updated set of labeled data candidates is treated as the set of labeled data candidates during a next training epoch that immediately follows the given training epoch;

training the neural network using a backpropagation algorithm based on a set of errors/losses determined for each given labeled data candidate of the set of labeled data candidates according to the classification by the neural network and a ground-truth classification to generate a trained neural network, and wherein the trained neural network is utilized as the neural network during the next training epoch; and determining, by the trained neural network, anomalous activity based on the electronic activity of the plurality of users, wherein the trained neural network is output based on the plurality of training epochs and a training termination criterion, the training termination criterion being based on a size of the incorrectly-classified subset at each given training epoch or relative to a minimum error level.

9. The computer-implemented method of claim 8, wherein the incorrectly-classified subset includes labeled data candidates that the neural network incorrectly classified as anomalous activity during the given training epoch, and wherein the updated set of labeled data candidates includes an entirety of the incorrectly-classified subset.

10. The computer-implemented method of claim 9, wherein the dropout percentage is based on a ratio of the size of the incorrectly-classified subset to a size of the correctly-classified subset.

11. The computer-implemented method of claim 10, wherein the dropout percentage varies inversely with the ratio of the size of the incorrectly-classified subset to the size of the correctly-classified subset.

12. The computer-implemented method of claim 9, further comprising:

ceasing, by the computer system, to perform the plurality of training epochs and ceasing, by the computer system, to iteratively update the set of labeled data candidates, based on determining that the size of the incorrectly-classified subset is below a minimum threshold.

13. The computer-implemented method of claim 9, further comprising:

ceasing, by the computer system, to perform the plurality of training epochs and ceasing, by the computer system, to iteratively update the set of labeled data candidates, based on determining that a ratio of the size of the incorrectly-classified subset to a size of the correctly classified subset is below a minimum threshold.

14. The computer-implemented method of claim 8, wherein the dropout percentage varies inversely with a total number of training epochs in the plurality of training epochs.

15. A computer program product for facilitating implicit curriculum learning, the computer program product comprising a computer-readable medium having program instructions embodied therewith, the program instructions executable by a computer system to cause the computer system to perform operations comprising:

performing a plurality of training epochs on a neural network to generate a trained neural network based on a set of labeled data candidates representative of electronic activity of a plurality of users and an implicit metric, the implicit metric being based on a classification accuracy of the set of labeled data candidates at each training epoch; and iteratively updating the set of labeled data candidates as the plurality of training epochs are performed, by:

classifying each labeled data candidate by the neural network according to a data type;

comparing the classification assigned by the neural network to a ground-truth classification associated with each labeled data candidate;

identifying, after each given training epoch in the plurality of training epochs, a correctly-classified subset and an incorrectly-classified subset within the set of labeled data candidates, wherein the correctly-classified subset includes labeled data candidates that the neural network correctly classified as anomalous activity during the given training epoch, and wherein the incorrectly-classified subset includes labeled data candidates that the neural network incorrectly classified during the given training epoch;

computing a dropout percentage based on a size of the correctly-classified subset and a size of the incorrectly-classified subset;

removing, from the set of labeled data candidates, the dropout percentage of the correctly-classified subset to generate an updated set of labeled data candidates, wherein the updated set of labeled data candidates includes an entirety of the incorrectly-classified subset, wherein the updated set of labeled data candidates is treated as the set of labeled data candidates during a next training epoch that immediately follows the given training epoch;

generating, for the updated set of labeled data candidates, a set of errors/losses, wherein an error/loss is determined for the given labeled data candidate according to the classification by the neural network and the ground-truth classification; and training the neural network based on the set of errors/losses and a backpropagation algorithm to generate a trained neural network model, and wherein the trained neural network is utilized as the neural network during the next training epoch; and determining, by the trained neural network, anomalous activity based on the electronic activity of the plurality of users, wherein the trained neural network is output based on the plurality of training epochs and a training termination criterion, the training termination criterion being based on a size of the incorrectly-classified subset at each given training epoch.

16. The computer program product of claim 15, wherein the iterative updating causes the set of labeled data candidates to become progressively smaller, and wherein each successive set of labeled data candidates comprises a higher ratio of incorrectly-classified candidates compared to correctly-classified candidates as the plurality of training epochs are performed, thereby causing the neural network to learn how to label based on the incorrectly-classified candidates without forgetting how to label the correctly-classified candidates.

17. The computer program product of claim 15, wherein the neural network is a fraud detection model that is configured to label an inputted online transaction as either fraudulent or non-fraudulent.

18. The computer program product of claim 17, wherein a data candidate from the set of labeled data candidates represents an online transaction that corresponds to a ground-truth label of fraudulent or non-fraudulent.

19. The computer program product of claim 15, wherein the given training epoch involves backpropagation to iteratively update parameters of the neural network.

20. The computer program product of claim 15, wherein the operations further comprise:

ceasing the performing the plurality of training epochs and ceasing the iteratively updating, based on the size of the incorrectly-classified subset being less than a minimum threshold.

* * * * *